(12) United States Patent
Elliott et al.

(10) Patent No.: US 11,358,886 B2
(45) Date of Patent: Jun. 14, 2022

(54) GELLING F.O.G. FOR LANDFILL DISPOSAL

(71) Applicant: Thermaco, Inc., Asheboro, NC (US)

(72) Inventors: Andree Elliott, Longview, TX (US); William C. Batten, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 0 days.

(21) Appl. No.: 17/267,565

(22) PCT Filed: Aug. 14, 2019

(86) PCT No.: PCT/US2019/046458
§ 371 (c)(1),
(2) Date: Feb. 10, 2021

(87) PCT Pub. No.: WO2020/037020
PCT Pub. Date: Feb. 20, 2020

(65) Prior Publication Data
US 2021/0246055 A1  Aug. 12, 2021

Related U.S. Application Data

(60) Provisional application No. 62/718,635, filed on Aug. 14, 2018.

(51) Int. Cl.
*C02F 1/68* (2006.01)
*B01J 13/00* (2006.01)
(Continued)

(52) U.S. Cl.
CPC .......... *C02F 1/683* (2013.01); *B01J 13/0065* (2013.01); *C02F 11/008* (2013.01); *C08L 1/286* (2013.01);
(Continued)

(58) Field of Classification Search
CPC .... C02F 1/683; C02F 11/008; C02F 2101/32; B01J 13/0065; C08L 1/286; C08L 2201/52; C08L 2312/00
See application file for complete search history.

(56) References Cited

U.S. PATENT DOCUMENTS 6,261,460 B1   7/2001  Benn
2002/0061322 A1*  5/2002  Keenan ................. C08F 265/06
                                                                    424/401
(Continued)

FOREIGN PATENT DOCUMENTS

WO    WO 2012/102757       8/2012

OTHER PUBLICATIONS

"Mesh Vs Micron—What is the difference?". No Author. Published Jun. 14, 2016. Retrieved from https://www.kmcoating.com/blog/mesh-vs-micron-what-is-the-difference/ on Aug. 27, 2021.*
(Continued)

*Primary Examiner* — Robert S Jones, Jr.
*Assistant Examiner* — Jiangtian Xu
(74) *Attorney, Agent, or Firm* — MacCord Mason PLLC

(57) ABSTRACT

A gel emulsification system and method for converting fats, oils, and grease (FOG) into a solid acceptable for landfill disposal. The method may include mixing FOG with a detergent and water to form an emulsion, adding viscosifier and a cross-linking agent to the emulsion, and mixing the emulsion and the viscosifier and cross-linking agent to form a gel. The system may include a container adapted to hold solids and liquids without leaking, a powdered detergent in the container to mix with water and a FOG to form an emulsion, and a powdered viscosifier and powdered cross-linking agent in the container adapted to thicken and cross-link the emulsion to form a gel. The gel formed passes a paint filter test (SW-846 Test Method 9095B).

12 Claims, 2 Drawing Sheets

(51) Int. Cl.
*C02F 11/00* (2006.01)
*C08L 1/28* (2006.01)
*C02F 101/32* (2006.01)

(52) U.S. Cl.
CPC ....... *C02F 2101/32* (2013.01); *C08L 2201/52* (2013.01); *C08L 2312/00* (2013.01)

(56) References Cited

U.S. PATENT DOCUMENTS

| | | | | |
|---|---|---|---|---|
| 2007/0269566 | A1* | 11/2007 | Curtis | A23L 33/40 426/519 |
| 2011/0197497 | A1* | 8/2011 | Jiang | C11B 3/14 44/307 |
| 2021/0070950 | A1* | 3/2021 | Fowler | C08J 3/242 |
| 2021/0230466 | A1* | 7/2021 | Hum | C07C 237/22 |
| 2021/0246055 | A1* | 8/2021 | Elliott | C02F 1/683 |

OTHER PUBLICATIONS (EPA) Method 9095B—Paint Filter Liquids Test. Nov. 2004; retrieved from the internet <http://www.caslab.com/EPA-Methods/PDF/EPA-Method-9095B.pdf>; on Sep. 30, 2019; pp. 1-4; figure 1.
International Search Report and Written Opinion for PCT Application No. PCT/US2019/46458 dated Oct. 24, 2019.

* cited by examiner

NaCMC

Citric acid

GELLING F.O.G. FOR LANDFILL DISPOSAL

BACKGROUND OF THE INVENTION

Current US regulations prevent the disposal of certain liquid waste in municipal solid waste landfills. In particular, fats, oils, and grease (FOG) are considered hazardous waste and must not be disposed of in landfills. A material is determined to be suitable for disposal if it satisfies the EPA's paint filter test (SW-846 Test Method 9095B). The paint filter test comprises the steps of placing the material onto a fine mesh paint filter placed over a container, and monitoring for liquid droppings over a period of time. If no liquid passes through the filter and drops into the container within a five-minute test period, the material is deemed to not contain any liquids.

Typically, grease traps are used to collect used FOG for disposal. A common installation mode is to install the FOG separator in a commercial kitchen such as a kitchen of a restaurant, food service facility, or the like. The installation usually takes as an input, all of the effluent from the various sources in the kitchen, such as pre-rinse sinks, ware-washing sinks, and dishwashers such as automatic dishwashers. Liquid state FOG from the FOG separator is often sent to rendering plants or other permitted uses. There is a need in the art for an alternative and cost-effective method for easily disposing of such fats, oils, and grease.

SUMMARY OF THE INVENTION

The present invention fulfills one or more of these needs in the art by providing a gel emulsification system and method for converting fats, oils, and grease into a form acceptable for landfill disposal. In one embodiment, the method comprises mixing a FOG with a detergent and water to form an emulsion, adding a viscosifier as a thickener, and mixing the viscosifier with the emulsion to form a gel, wherein the gel passes a paint filter test (SW-846 Test Method 9095B).

One example of a detergent suitable for use with the above-described method is sodium dodecyl sulfate. However, other amphiphilic and/or ionic detergents may potentially be used. The viscosifier may comprise a cellulose such as carboxymethyl cellulose. The carboxymethyl cellulose may be bound to an alkali or an alkaline earth metal, such as sodium or calcium, respectively. Depending on the components, the FOG may be mixed with the detergent, water, and viscosifier simultaneously in a single step. It is believed that fats, oils, and grease will act like the oil.

The invention may also be considered as a gel emulsification system for solidifying fats, oils, and grease (FOG) sufficiently that landfill disposal is permitted. The system may comprise a container adapted to hold solids and liquids without leaking, a powdered detergent in the disposable container for forming an emulsion with FOG and water, and a powdered viscosifier in the disposable container adapted to thicken the emulsified oil. When FOG and water are added to the container and mixed with the powdered detergent and the powdered viscosifier, these form a solid gel within the container that passes the SW-846 Test Method 9095B.

In one embodiment, the detergent is a sulfate-type anionic detergent. For example, the sulfate-type anionic detergent may be sodium dodecyl sulfate. In one embodiment, the viscosifier is a carboxymethyl cellulose. For example, the carboxymethyl cellulose may be sodium carboxymethyl cellulose. The detergent and emulsion thickener may be provided in about a 1:2 weight ratio of detergent to emulsion thickener.

In another aspect, the invention provides a viscosifying additive to be added to FOG, detergent, and water to cause the FOG, water and viscosifying additive to form a gel that passes the SW-846 Test Method 9095B.

In another aspect, the invention provides a gel that passes the SW-846 Test Method 9095B made up of a detergent, viscosifier, water and FOG collected from a commercial kitchen. In one embodiment, the FOG and the water are mixed in about a 1:2 ratio by volume. In one embodiment, the detergent and the emulsifying agent are mixed in about a 1:2 ratio by weight.

The invention can also be considered as an emulsification method to form fats, oils, and grease (FOG) into a gel suitable for disposal in a landfill including mixing FOG and a detergent solution to form an emulsion, and a viscosifier and mixing to form a gel, wherein the gel passes the paint filter test according to SW-846 Test Method 9095B. Mixing FOG, a detergent solution and viscosifier may include mixing with a cross-linking agent, such as citric acid.

The invention can also be considered as an emulsification method to make FOG into a gel suitable for disposal in a landfill including mixing FOG with an aqueous solution of sodium dodecyl sulfate to make an emulsion and adding citric acid and sodium carboxymethyl cellulose and mixing to form a gel, wherein the gel passes the paint filter test according to SW-846 Test Method 9095B. Preferably, the volume-to-volume water-to-FOG ratio of the gel is less than 0.8. More preferably, the ratio is less than 0.3.

The invention can also be considered as an emulsification method to form fats, oils, and grease (FOG) into a gel for disposal in a landfill including mixing FOG with water and a detergent to form an emulsion, and adding a viscosifying additive to the emulsion and mixing at a temperature between 20° C. and 40° C. to form a gel that passes the paint filter test according to SW-846 Test Method 9095B. Preferably, mixing takes place at about 30° C. The detergent should be in aqueous solution.

The invention can also be considered as a gel including a fats, oils, grease or combination thereof; a detergent; viscosifier; a cross-linking agent; and water, wherein the gel passes the paint filter test according to SW-846 Test Method. The fats, oils, or grease and the water preferably have a ratio by weight of 1 part of fats, oils, or grease or combination thereof to not more than 1 part of water, and more preferably not more than 0.8 part of water, vol/vol and even more preferably not more than 0.3 part of water. The detergent may be sodium dodecyl sulfate, the viscosifier may be sodium carboxymethyl cellulose, and the cross-linking agent may be citric acid.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
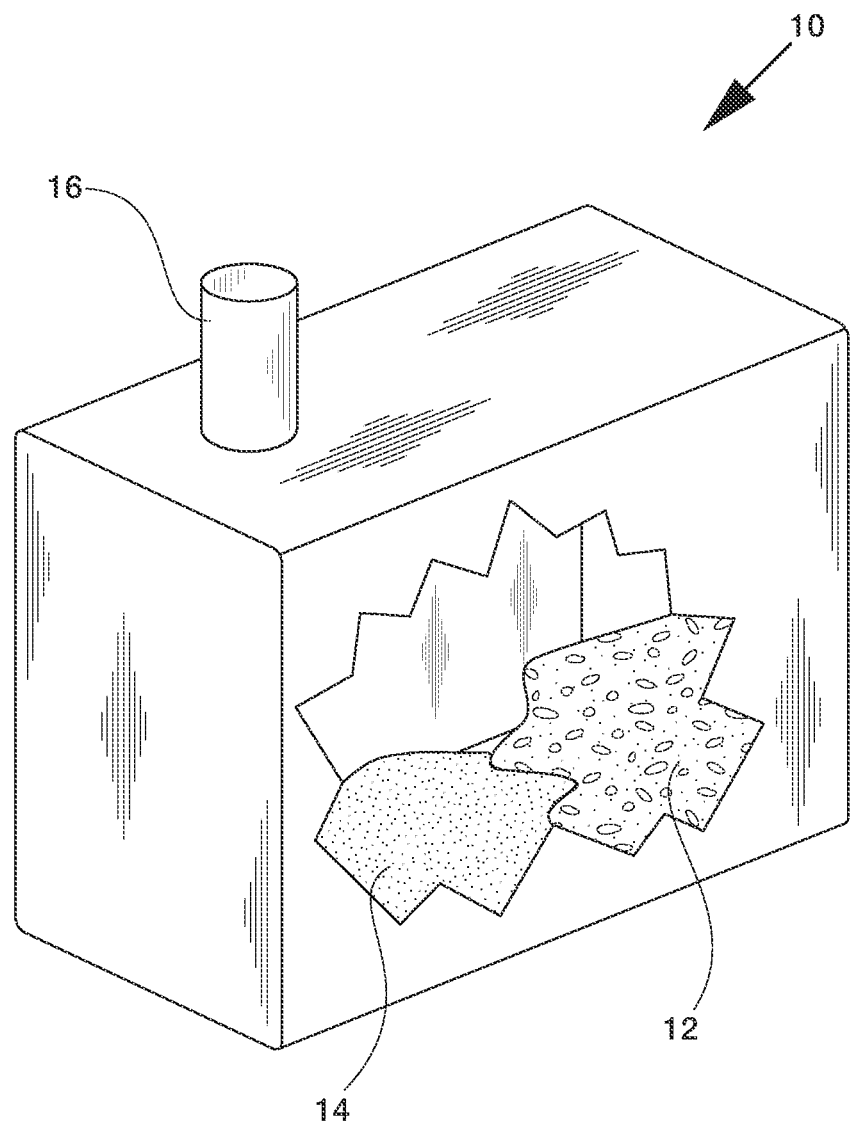
FIG. 1 is a front perspective view of a gel emulsification system according to one embodiment of the present invention.

One aspect of the present invention is directed to a system for disposing of fats, oils, and grease (FOGs). In one embodiment as seen in FIG. 1, the system is comprised of a container 10 containing a mixture of a detergent 12 and a viscosifier 14 as a thickening agent. Both reagents may be provided in powdered form, but it is preferred that the detergent be provided in an aqueous solution.

The container has an inlet 16 adapted to receive FOG intended for disposal. Once FOG is added to the container 10, the detergent 12 and water 14 forms an emulsion with the FOG. A gel is formed within the bag upon the addition of the viscosifier to the emulsion. Some water is likely to accompany the FOG, so a separate addition of water may not be needed. The container may be disposable and capable of holding liquids without leaking. In one embodiment, the container is a disposable bag.

The detergent is selected to form an emulsion with FOGs and water to yield a solid upon the addition of the other reagents. Suitable detergents for forming an emulsion with FOGs and water include sodium dodecyl sulfate (SDS), Borax, and sodium carbonate.

The SDS gel formulas are less caustic to humans than sodium carbonate (washing soda) gel formulas. In the washing soda mixture, sodium carbonate reacts with water, yielding two products, one of which is sodium hydroxide, a strong base. The ensuing reaction between the sodium hydroxide and the triglycerides present in the FOG is exothermic. Thus, the concerns for using the sodium carbonate gel formula are two-fold: 1) possible skin or eye exposure to sodium hydroxide during the mixing of the powders with the FOG; and 2) the bag may potentially leak as a result of the heat released by the chemical reaction taking place within the bag. SDS is considered as a "generally recognized as safe" (GRAS) ingredient for food use according to guidelines in the U.S. government document, 21 CFR 172.822 since, in low concentrations, SDS is found in toothpastes, shaving creams, bubble bath formulas, and as a whipping aid in some foods. Therefore, in certain embodiments, the detergent is preferably a SDS detergent.

The viscosifier is adapted to act as a thickener with the emulsified oil to form a solid gel. The viscosifier may be a hygroscopic industrial gum. Suitable viscosifiers include k-carrageenan and carboxymethyl cellulose (CMC). Further examples include an alkali or alkaline earth metal bound to CMC, such as sodium carboxymethyl cellulose (NaCMC) or calcium carboxymethyl cellulose (CaCMC).

Without being confined to any particular theory as to the mechanism, it is postulated that the SDS and CMC react with water and FOG as follows. The hydrophobic tails of SDS molecules solvate the fatty acid hydrocarbon chains of the FOG triglycerides via hydrophobic interactions. The polar/hydrophilic heads of SDS molecules form electrostatic bonds with water molecules. Thus, the lipid molecules are moved into the aqueous bulk phase and, as such, are suspended in the water. In other words, the FOG is dispersed throughout the water phase. Simultaneously, water molecules also hydrogen-bond with the substituted groups of the CMC molecules, causing an increase in viscosity. The result is a thickened FOG gel that is acceptable for disposal in a landfill.

In certain embodiments, the gel formed is biodegradable. For example, both SDS and CMC are considered biodegradable reagents. SDS includes a hydrocarbon chain (C12) with an ionic sulfate group. The available data indicate all fatty acid salt chain lengths up to and including C18 can be metabolized under aerobic conditions and can be considered to be readily biodegradable. Reported data from anaerobic biodegradability tests of fatty acids (C12-C18) and their Na-salts prove these substances to be very well accessible to ultimate biodegradation under anaerobic conditions. See "HERA: Human & Environmental Risk Assessment on Ingredients of European household cleaning products— Fatty Acid Salts (Soap) Environmental Risk Assessment" (2003). Similarly, the FOGs being solidified for disposal are also comprised of fatty acid chains and therefore also biodegradable.

Carboxymethyl cellulose is also considered biodegradable. It is derived from cellulose and made water-soluble by a chemical reaction that introduces carboxymethyl groups along the cellulose chain; this makes hydration of the molecule possible. Water molecules hydrogen-bond with the substituted groups. The degree of substitution (DS) is the average number of carboxymethyl groups per anhydroglucose unit. Theoretically, the maximum DS is 3. The normal DS range for commercially available CMC is approximately 0.5-1.5. As related to disposal in a landfill, the higher the degrees of substitution of CMC molecules, the greater the resistance to enzymatic degradation by microorganisms or by oxidants. However, all CMC grades are biodegradable since they are derived either from wood pulp or, sometimes, from cotton linter. See Ginkel C.G. van and Gayton S., Environmental Toxicology Chemistry 15, 270-274.

Another aspect of the invention is directed to a method for disposing FOGs by forming a gel. In one embodiment, the method comprises mixing a FOG, a detergent, and water to form an emulsion, and mixing the emulsion and a viscosifying additive to form a gel.

In one embodiment, the method comprises mixing a FOG and water with a detergent to form an emulsion. A viscosifying additive or viscosifier (as described above) may be added before or after the FOG to serve as a thickener. Once the emulsion and viscosifier are mixed, a gel is formed.

Another aspect of the invention is directed to a gel formed from FOGs, water, a detergent and a viscosifier. In one embodiment, the gel is comprised of FOG and water in about a 1:2 ratio by volume. In one embodiment, the gel is comprised of detergent and emulsifying agent in about a 1:3 ratio by weight.

The systems and methods are compatible with numerous types of FOGs, including olive oil, canola oil, sunflower oil, peanut oil, soybean oil, coconut oil, sweet cream whipped butter, margarine, vegetable shortening, lard, and mixtures thereof.

EXAMPLES

The following examples are illustrative of the present invention, but are not intended to limit the scope of the present invention.

Example 1

Initial Identification of Detergents and Viscosifiers Suitable for Gel Emulsification of Fats, Oils and Grease In order to identify whether ingestible fats, oils and grease may be capable of forming a solid gel for disposal in a landfill, various formulas were tested to determine which reagents produced a gel suitable for disposal. A gel was determined to be suitable for disposal if it satisfies the EPA's paint filter test. The paint filter test comprises the steps of placing a formed gel onto a fine mesh paint filter placed over a container, and monitoring for liquid droppings over a period of time (see SW-846 Test Method 9095B). Per method 9095B, if no liquid drops from the gel within a five-minute test period, the material is deemed to not contain any liquids. Gels in the paint filter test apparatus were also monitored over a 24-hour period.

TABLE 1

| Formula | Pass Paint Filter Test | |
|---|---|---|
| | 5 minutes | 24 hours |
| Lecithin (emulsifier), k-carrageenan (hygroscopic industrial gum), and calcium chloride (cross-linking agent) | Yes | Yes |
| Liquid DAWN ® detergent (emulsifier) and calcium carboxymethyl cellulose (CaCMC) (hygroscopic industrial gum) | Yes | Yes |
| Powdered Borax detergent (emulsifier) and CaCMC (hygroscopic industrial gum) | Yes | Yes |

Although each of the formulas listed in Table 1 successfully thickened 100 mL of canola oil to form a gel that passes the five-minute paint filter test, there are some disadvantages for each. The use of lecithin and k-carrageenan requires the addition of a third reagent (a 30 mM calcium chloride solution) for cross-linking that increases cost and reduces packaging efficiency. The use of liquid DAWN® detergent mixed with CaCMC has several drawbacks. A creamy mixture is produced that passes the five-minute paint filter test, but does not form a gel as solid as other formulas. Moreover, this formulation requires the packaging of a liquid. Despite these noted drawbacks, the formulas listed above are deemed to be within the scope of the present invention.

A gel formula comprising two all-solid reagents is most preferable. The gel that forms with powdered Borax and CaCMC meets all the desirable criteria: a firm, dry gel that is produced using all solids (powders), and that readily passes the five-minute paint filter test. However, one drawback is that the borate ion present in Borax is a less desirable material for deposition in a landfill.

Example 2

Identification of Improved Formulations for Gel Formation

Several modifications were made to the liquid DAWN® detergent (emulsifier) and calcium carboxymethyl cellulose (CaCMC) (hygroscopic industrial gum) formulation.

The CaCMC was substituted with NaCMC to determine if NaCMC will work in producing a thick oil gel. The reason for this substitution is that NaCMC is more readily available and presumably less expensive compared with CaCMC.

Since the liquid DAWN® detergent works well as an emulsifier, other comparable powdered substitutes were tested to determine whether a powder would form a drier gel than that made with DAWN®. The primary ingredient (30-50%) in DAWN® is sodium dodecyl sulfate (SDS), also known as sodium lauryl sulfate (SLS). Therefore, SDS (which can be obtained in powder form) was tested for use as the oil emulsifier.

In the making of homemade detergents, powdered washing soda (sodium carbonate) is used with Borax powder. If the sodium ion of the washing soda were to bond with the carboxylic acid group of the oil's fatty acids, an emulsifier would form, as occurs with Borax. Washing soda is readily available and inexpensive. A somewhat different approach is to identify a detergent with a cation other than sodium, which is present in the SDS and washing soda detergents. Periodic Table Group IA and Group IIA metals reportedly make soaps that are good for thickening greases and are sold by companies in the lubricant industry. Two options identified as possibilities for use are a lithium soap and a calcium soap. In these cases, the soap, rather than the CaCMC (or potentially the NaCMC), would provide the cross-linking agent.

1. Materials and Methods

For each paint filter test, each formula was tested as follows. Fifty milliliters of canola oil were mixed with 10 grams of detergent. Once the oil and detergent are blended together, 15 grams of cross-linking reagent was added to the mixture and mixed together. After mixing the cross-linking reagent with the FOG and detergent, 25 mL of water was added to produce a gel.

2. Results

TABLE 2

| Detergent/Cross-Linking Agent | Pass Paint Filter Test | |
|---|---|---|
| | 5 minutes | 24 hours |
| Liquid DAWN ®/CaCMC | Yes | Yes |
| GAIN ® powder detergent | No; detergent was unable to mix with FOG to form an emulsion. | N/A |
| Borax powder/CaCMC | Yes | Yes |
| Borax powder/NaCMC | Yes | No |

While most of the formulas in Table 2 formed a gel with canola oil, some blends produced a more desirable gel than others. The FOG and DAWN® detergent blended completely together, and the CaCMC blended completely with the oil/DAWN® mix. After water was added, a very creamy mix was produced, which passed the five-minute paint filter test when placed into the fine mesh paint filter. After 24 hours, there were still no drips.

When oil and GAIN® detergent were mixed together, the oil remained as a separate phase. Therefore, no viscosifying reagent was added and this experiment was suspended.

The oil and Borax powder blended completely together, and the CaCMC blended completely with the oil/Borax mix. Afterwards, water was added which resulted in a dry, crumbly gel. The gel was placed into the fine mesh paint filter and passed the five-minute test. After 24 hours, there were still no drips. This gel is comparable to the lecithin/k-carrageenan/calcium chloride gels previously produced.

In another experiment, NaCMC was added as a viscosifier to the oil/Borax mixture. The NaCMC blended with the oil/Borax mix, but did not mix as well as compared to the CaCMC mixture. A rather wet, crumbly gel was produced after water was added. Although this gel passed the five-minute test, there were a few drops of oil that passed through the paint filter after 15 minutes. After 24 hours, there was approximately 9 mL of oil that had passed through the paint filter into the collecting jar. For these reasons, the NaCMC/Borax gel is not preferred for disposal in a landfill.

The CaCMC/Borax mixture works the best to successfully thicken canola oil. While the CaCMC/DAWN® mixture also works well to thicken canola oil, it did not produce a gel as well as the CaCMC/Borax gel.

Example 3

Optimization of Gel Emulsification System and Method using Sodium Carboxymethyl Cellulose as the Viscosifier Further tests were conducted to determine if a desirable gel can be produced using NaCMC, since NaCMC is less expensive than CaCMC.

TABLE 3

| Detergent/Cross-Linking Agent | Pass Paint Filter Test | |
|---|---|---|
| | 5 minutes | 24 hours |
| SDS/CaCMC | Yes | Yes |
| SDS/NaCMC | Yes | Yes |
| Sodium Carbonate/NaCMC | Yes | Yes |
| Lithium Soap/NaCMC | Yes | No |

Almost all of the gel formulas listed in Table 3 produced oil-thickened gels acceptable for landfill disposal. While all of the gels listed above pass the five-minute paint filter test, the lithium soap gel dripped about 10 mL of oil after being in the paint filter for 24 hours. For that reason, it is not considered as a preferred embodiment. Based on the considerations of cost and gel quality, it has been determined that the SDS-NaCMC formula is most preferred for thickening cooking oil for the purpose of disposal in a landfill.

Example 4

Optimization of Ingredients Ratio to Standardize Formula

A variety of ratios for SDS/NaCMC were tested to determine whether there is an optimal ratio for thickening FOGs into a gel.

A 1:3 ratio (by weight) of SDS/NaCMC in which 5 g SDS and 15 g NaCMC were mixed with 100 mL olive oil to which was added 200 mL tap water (in 50 mL increments). This formula produced an oil gel that passed the 5-minute paint filter test; its consistency is that of biscuit dough.

A 1:2 ratio (by weight) of SDS/NaCMC in which 5 g SDS and 10 g NaCMC were mixed with 100 mL olive oil to which was added 200 mL tap water (in 50 mL increments). This formula produced an oil gel that passed the five-minute paint filter test; its consistency is that of a wet biscuit dough.

An initial 1:3 ratio (by weight) of SDS/NaCMC in which 1 g SDS and 3 g NaCMC were mixed with 100 mL olive oil was tried; it left a good deal of oil that did not emulsify, and therefore, water was not added. An additional 2 g SDS was added to the mix to give a 1:1 weight ratio of SDS/NaCMC; there was still unmixed oil. The amount of SDS and NaCMC was increased to a total of 5 g of each, maintaining the 1:1 weight ratio. To this mixture of 100 mL olive oil, 5 g SDS, and 5 g NaCMC was added water in 50 mL increments using a final volume of 150 mL of water. At this point, the gel did not thicken any further; it passed the five-minute paint filter test but was very wet. Its consistency is more that of a cream than a gel.

After four days of the olive oil/SDS/NaCMC gels (1:1, 1:2, and 1:3 SDS/NaCMC weight ratios) being in paint filters, there were still no drips from any of the three gels.

Example 5

Determining Whether the SDS/NaCMC Gel Formula Will Solidify a Variety of Lipids

To determine if the resulting gels would pass the five minute paint filter test, gels using each of the listed lipids were made with the following formula: 5 g SDS, 15 g NaCMC (i.e., 1:3 SDS:NaCMC), 200 mL Longview, Tex. tap water, and 100 mL of one of the following oils: olive oil [comprised of 58% linoleic acid (18:2); 27.3% oleic acid (18:1)]; sunflower oil [comprised of 59% linoleic acid (18:2); 30% oleic acid (18:1); 6% stearic acid (18:0); 5% palmitic acid (16:0)]; peanut oil [comprised of 47% oleic acid (18:1); 33% linolenic acid (18:3); 10% palmitic acid (16:0)]; soybean oil [comprised of 51% linoleic acid (18:2); 23% oleic acid (18:1); 7% linolenic acid (18:3)]; coconut oil [comprised of 48% lauric acid (12:0); 16% myristic acid (14:0); 9.5% palmitic acid (16:0)]; sweet cream whipped butter (Land 0 Lakes) (melted) [comprised of 50% saturated fat; 21% monounsaturated fat—based on grams of fat per serving size]; margarine (Imperial 53% Vegetable Oil Spread (melted) [comprised of soybean oil, palm oil, palm kernel oil]; vegetable shortening (Crisco butter flavor all-vegetable shortening) (melted) [comprised of soybean oil, fully hydrogenated palm oil, palm oil, mono and diglycerides]; lard (Armour) (melted) [comprised of lard and hydrogenated lard]. Eleven milliliters of each of the nine lipids listed above were mixed together to determine if the FOG mixture thickened using the SDS:NaCMC formula.

TABLE 4

| Lipid (treated with 1:3 weight ratio of SDS/NaCMC) | Pass Paint Filter Test |
|---|---|
| Olive oil | Yes |
| Sunflower oil | Yes |
| Peanut oil | Yes |
| Soybean oil | Yes |
| Coconut oil | Yes |
| Sweet cream whipped butter | Yes |
| Margarine | Yes |
| Vegetable shortening | Yes |
| Lard | Yes |
| Combined Mixture of all Tested Lipids | Yes |

All the individual lipids tested successfully thickened, using a 1:3 weight ratio of SDS:NaCMC formula. That is, the ingestible oils, as well as melted butter, margarine, shortening, and lard all passed the five minute paint filter test. The mixture of all tested lipids also thickened and passed the five minute test.

Example 6

Determining if Anionic Detergents other than SDS Work with NaCMC to Solidify Lipids Three different anionic detergents were substituted for the anionic detergent SDS in the 1:3 formula added to NaCMC to thicken ingestible lipids. The following anionic detergents were individually tested in place of SDS: Alconox Powdered Precision Cleaner consisting of sodium alkylbenzene sulfonate, sodium tripolyphosphate, and tetrasodium pyrophosphate (purchased from Amazon); N-Lauroylsarcosine (purchased from Sigma-Aldrich); and sodium deoxycholate—a type of bile salt (purchased from Sigma-Aldrich). Each detergent was tested with olive oil with the following formula: 5 g detergent, 15 g NaCMC (i.e., 1:3 weight ratio of detergent:NaCMC), 200 mL Longview, Tex. tap water, and 100 mL olive oil [comprised of 58% linoleic acid (18:2); 27.3% oleic acid (18:1)].

TABLE 5

| Detergent (with NaCMC) | Pass Paint Filter Test | |
|---|---|---|
| | 5 minutes | 24 hours |
| Alconox Powdered Precision Cleaner | No | N/A |
| N-Lauroylsarcosine | Yes | No |
| Sodium Deoxycholate | No | N/A |

As seen in Table 5, the gels made using the anionic detergents Alconox and sodium deoxycholate as substitutes for SDS detergent failed the five minute paint filter test. The gel made using anionic detergent N-lauroylsarcosine as a substitute for SDS detergent, passed the five minute paint filter test; however, it was quite oily and did begin dripping within 24 hours.

Example 7

Determining if Sulfate-Type Anionic Detergents other than SDS Work with NaCMC to Solidify Lipids Sodium octyl sulfate (SOS) was another sulfate-type anionic detergent to be tested. Using a 1:3 weight ratio, the following reagents were used and mixed together in a 100 mL beaker: 1 g SOS, 3 g NaCMC, 40 mL Longview, Tex. tap water and 20 mL corn oil [comprised of 58% linoleic acid (18:2); 27.3% oleic acid (18:1)]. A second test was conducted in a 1000 mL beaker mixing together all of the following ingredients: 20 mL sunflower oil [comprised of 59% linoleic acid (18:2); 30% oleic acid (18:1); 6% stearic acid (18:1); 5% palmitic acid (16:0)]; 20 mL peanut oil [comprised of 47% oleic acid (18:1); 33% linolenic acid (18:3); 10% palmitic acid (16:0)]; 20 mL soybean oil [comprised of 51% linoleic acid; 23% oleic acid (18:1); 7% linolenic acid (18:3)]; 20 mL coconut oil [comprised of 48% lauric acid (12:0' 16% myristic acid (14:0); 9.5% palmitic acid (16:0)]; 4 g SOS; 12 g NaCMC; and 160 mL Longview, Tex. tap water.

To determine if the sodium decyl sulfate can be used as a detergent to form a gel with FOG, the following ingredients were mixed together in a 1000 mL beaker: 100 mL corn oil [comprised of 58% linoleic acid (18:2); 27.3% oleic acid (18:1)]; 5 g sodium decyl sulfate; 15 g NaCMC; and 200 mL Longview, Tex. tap water. A second test using sodium decyl sulfate was also performed to determine if sodium decyl sulfate would work to thicken a blend of oils. The following ingredients were mixed together in a 1000 mL beaker: 20 mL corn oil [comprised of 58% linoleic acid (18:2); 27.3% oleic acid (18:1)]; 20 mL sunflower oil [comprised of 59% linoleic acid (18:2); 30% oleic acid; 18:1); 6% stearic acid (18:1); 5% palmitic acid (16:0)]; 20 mL peanut oil [comprised of 47% oleic acid (18:1); 33% linolenic acid (18:3); 10% palmitic acid (16:0)]; 20 mL soybean oil [comprised of 51% linoleic acid; 23% oleic acid (18:1); 7% linolenic acid (18:3)]; 20 mL coconut oil [comprised of 48% lauric acid (12:0' 16% myristic acid (14:0); 9.5% palmitic acid (16:0)]; 5 g sodium decyl sulfate; 15 g NaCMC; and 200 mL Longview, Tex. tap water.

TABLE 6

| Detergent (with NaCMC) | Pass Paint Filter Test | |
|---|---|---|
| | Corn Oil | FOG Mixture |
| Sodium Octyl Sulfate (SOS) | Yes | No |
| Sodium Decyl Sulfate | Yes | Yes |

The first mixture using SOS, NaCMC, water, and corn oil thickened nicely forming a light and fluffy gel. However, the second SOS mixture using a blend of the four different oils did not form a gel of the same consistency as the first one. The second mixture thickened but, even after extensive stirring, remained very oily. The combined gels that were stirred together and placed into the fine mesh paint filter immediately began dripping oil into the collecting jar, thus failing the five-minute paint filter test.

The first mixture using corn oil and sodium decyl sulfate readily formed a thick, fluffy gel that passed the five-minute paint filter test. The second mixture using a blend of five oils (a mix of polyunsaturated and saturated oils) and sodium decyl sulfate also readily formed a thick, fluffy gel that passed the five-minute paint filter test. The data suggest that the longer the detergent's hydrocarbon chain, the better job it does in emulsifying ingestible oils.

Example 8

Determining Effective Ranges of Water/FOG Ratios

Several ratios of water and FOG were tested using the paint filter test to determine an optimal range. In these set of experiments, soybean oil was used as the FOG and combined with SDS (3 g) and NaCMC (8 g).

TABLE 7

| Amount of Water (mL) | Amount of Oil (mL) | Pass (P)/Fail (F) | Notes |
|---|---|---|---|
| 30 | 50 | F | Failure nearly immediately |
| 35 | 50 | F | Failure nearly immediately |
| 36 | 50 | F | Failure at four minutes |
| 37 | 50 | F | Failure nearly immediately |
| 38 | 50 | P | Failure after twenty minutes |
| 39 | 50 | P | Failure after seven hours |
| 40 | 50 | P | Failure after seventy-two hours |
| 50 | 50 | P | Failure after seventy-two hours |

As seen in Table 7, gels having a water-to-FOG ratio of 0.74:1 or lower did not pass the paint filter test. Gels having a 0.75:1 up to a 1:1 ratio were able to pass the paint filter test, with higher ratios giving better results.

Additional water enables the mixture to further thicken into a gel. The maximum amount of water that can be added before the gel fails the paint filter test was also determined. Using the pre-determined 1:3 ratio of SDS:NaCMC and 100 mL of corn oil, water was added until dripping occurred in the five-minute paint filter test. It took 900 mL of water to the oil mixture before any dripping occurred in the five-minute paint filter test. In other words, no more than about 9 times as much water as oil can be added to the oil/SDS/NaCMC mixture in order to pass the drip test. Ratios of water higher than about a 2:1 ratio results in a thinner gel, and at about 9:1, no longer passes the paint filter test. Thus, the range of water/FOG ratio for obtaining a gel that passes the paint filter test using a 1:3 SDS/NaCMC mixture is between about 0.75:1 and about 8:1. Within that range, a ratio between about 1:1 and about 3:1 produces a thick gel, with about a 2:1 ratio being most optimal for this embodiment.

Reduced Water Embodiments

The embodiments described above call for a relatively large volume of water, with the optimal being water:FOG in a 2:1 ratio. The weight of a resulting gel produced from 40 gallons of ingestible oil is unwieldy, so an improved gel formula modification is needed to produce a gel that weighs less. Various modified gel formulas were tested in order to thicken peanut oil (representing FOG) using less water than the original SDS/NaCMC oil thickening formula.

One formula modification approach used calcium as a cross-linker to potentially require less water to thicken FOG in the SDS/NaCMC mixture. Calcium carbonate sand, calcium carbonate powder, calcium chloride pellets, calcium chloride solution, and calcium hydroxide powder sources were tried, but minimal and unsatisfactory success was achieved. Either the oil did not thicken sufficiently to pass the five-minute paint filter test, or the calcium source (specifically, calcium chloride) had to be in solution in order to form a stiff gel that did not drip in the paint filter. Even when some attempts using calcium hydroxide powder worked to produce a gel that passed the five-minute paint filter test, the gel dripped through the filter after several hours.

Thus, after multiple failed gel products were produced using calcium, a different cross-linking agent was sought and identified: citric acid. Citric acid (hereafter referred to as TCA for tricarboxylic acid) has been successfully used in making microemulsion gels for the purpose of drug delivery, and TCA is used as a "viscosifier" with NaCMC in drilling muds in the oil and gas industry. Other cross-linking agents (besides TCA) can be used with NaCMC to increase gel viscosity. As an added benefit, cross-linking agents like TCA are biodegradable. However, TCA seems to be the best choice since it is available in powder form and is available in-bulk from a number of different suppliers. As a result, TCA was tested in various proportions with SDS, NaCMC, peanut oil, and water to create a FOG thickening formula that produces a gel using less water and thereby weighing less.

The preferred formula producing a gel with the lowest mass is:

5 g SDS
15 g NaCMC
20 g TCA (tricarboxylic acid aka citric acid)
100 mL peanut oil or FOG
60 mL water The mass of the gel produced using the above amounts was measured to be 171.05 grams. A gel using peanut oil and the original oil thickening formula (5 g SDS, 15 g NaCMC, 100 mL peanut oil, and 200 mL water) was also prepared and weighed; it had a mass of 295.40 g. The revised formula reduces the mass of the gel by 42%.

One gallon of vegetable oil (specifically, palm kernel oil) has a mass of 3481.6 g, so given the masses and proportions of ingredients used in thickening 40 gallons of FOG, the following conclusions can be drawn:

Forty gallons of FOG thickened with the original SDS/NaCMC formula has a mass of 472.8 kg and weighs 1043 pounds.

Forty gallons of FOG thickened with the new SDS/NaCMC/TCA formula has a mass of 290.9 kg and weighs 642 pounds.

So, for gels produced from 40 gallons of FOG, there is a calculated 38% reduction of gel mass and weight; this percentage is comparable to the 42% mass reduction that was calculated from gels made in the lab using 100 mL of peanut oil. (The percent difference probably has to do with variations in the densities of the different types of oils.) The new FOG thickening formula, therefore, does reduce the weight of thickened FOG gel to an extent. Optimizing the type of NaCMC used to thicken the FOG (i.e., optimal NaCMC molecular weight and degree of substitution) may be able to somewhat further reduce the volume of water needed to form a sufficiently thick gel.

An attempt to thicken peanut oil was made using 5 g SDS, 15 g NaCMC, and a 5% solution of acetic acid (distilled vinegar). A total of volume of 80 mL of vinegar was needed to thicken the oil sufficiently. However, because acetic acid is not available in powder form and the result was not any better than using TCA, further testing using acetic acid (vinegar) was suspended.

As is apparent the reactions involved are not straightforward, and unexpected results can occur. For example, potassium chloride (KCl) is a known gelling agent when added to an anionic surfactant, but has been found to be unsuccessful; it caused the FOG to thicken less.

A second approach to reducing the amount of water needed involves applying heat to the FOG-thickening process. It is known that heating an aqueous solution of NaCMC and TCA to 60° C. or higher causes the formation of covalently-bonded cross-links between NaCMC and TCA, thereby decreasing the gel's swelling capacity. Projections were that heating FOG to 30° C. lowered the volume of water required to thicken 100 mL of FOG from 60 mL to 30 mL, a further 50% reduction in water. This decrease in water volume correlates to a measured 12% reduction in gel mass as compared with making a gel with the same components using the previously reported formula. However, it was discovered that at the temperatures required to form covalent cross-links, SDS decomposes, thereby making the covalent cross-linking protocol unusable for the purpose of FOG-thickening.

But what was also discovered, surprisingly, is that when SDS is dissolved by itself in water, it becomes more effective as an emulsifier. When an aqueous solution of SDS is used (rather than adding SDS as a powder), the 50% decrease in required water volume and the 12% decrease in gel mass is achievable. A discussion of the cross-linking mechanism and a description of the materials and methods used and experimental results obtained follow.

Figure 2:
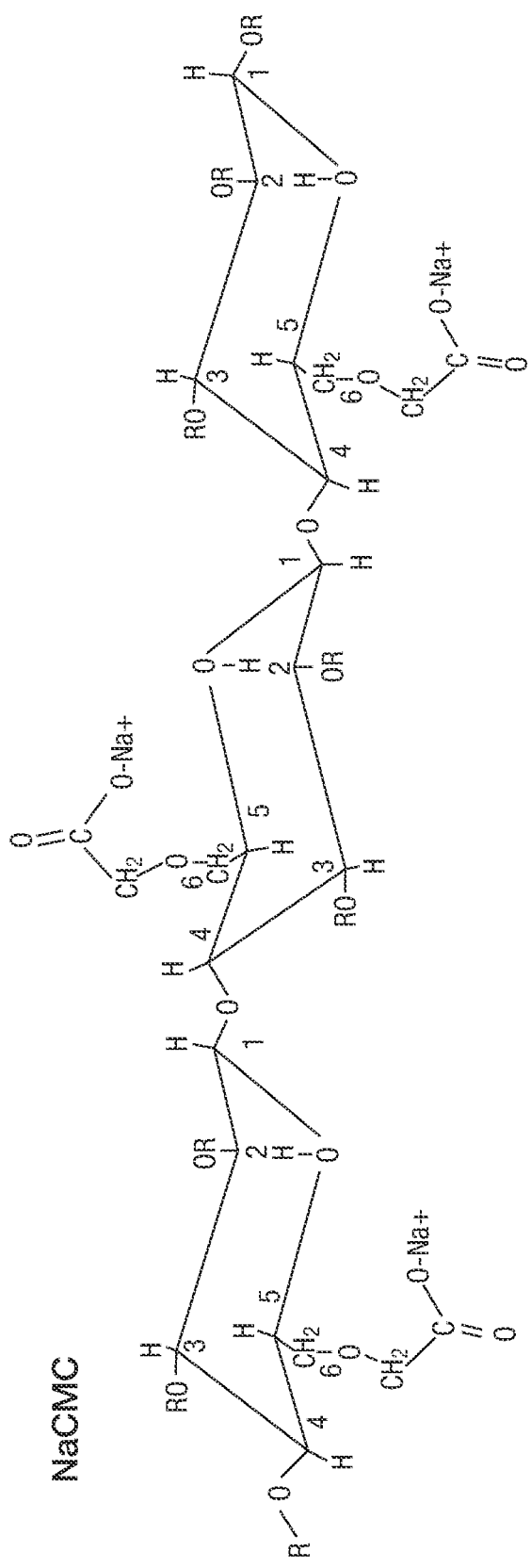
FIG. 2 is a schematic representation of NaCMC and citric acid (TCA) in which in the NaCMC molecule, "R" can be either a H atom or the $CH_2COO^-Na^+$ substituent (depending on the degree of substitution)
Figure 2:
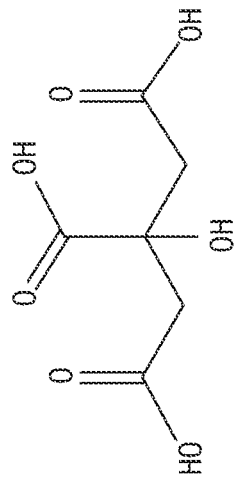

Polymers and/or polyelectrolytes in aqueous solution are known to form structures called hydrogels that entrap large amounts of water. A hydrogel can be classified as a physical gel or a chemical gel based on the type of bonds involved in cross-linking the gel molecules. A physical gel is formed by molecular self-assembly through ionic or hydrogen bonds, while a chemical gel is formed by covalent cross-linking bonds. Sodium carboxymethyl cellulose (NaCMC) (FIG. 2) is a polyelectrolyte that forms a hydrogel when exposed to water, and a number of cross-linking agents (including TCA) (FIG. 2) can be used to form a cellulose-based gel. Because cellulose contains three hydroxyl groups per monomer, cross-linking by TCA may occur via hydrogen bonds between NaCMC and TCA molecules to form a physical hydrogel. For thickening ingestible oils, the detergent sodium dodecyl sulfate (SDS) may also be included with the NaCMC and TCA as a means to emulsify the FOG and water.

However, when TCA is heated, it dehydrates to yield a cyclic anhydride intermediate (FIG. 3) that reacts with the free hydroxyl groups of the NaCMC polymer to form covalent cross-linking bonds between the NaCMC and TCA molecules, thus forming a chemical gel.

More specifically, the reaction mechanism involves the attachment of a TCA carboxylic acid moiety to a hydroxyl group of the cellulose monomer (glucose residue) via an esterification reaction. The first condensation of the TCA anhydride with the cellulose hydroxyl group leads to a fast disappearance of the anhydride carbonyl (C=O) group. Then, the carboxylate groups of the TCA molecule linked to the NaCMC polymer are capable of forming another intramolecular anhydride moiety. Further reaction of this anhydride with a cellulose hydroxyl group of another NaCMC chain can lead to cross-linking.

It has been determined that when an aqueous solution of NaCMC and TCA is heated, a TCA concentration of 20% (w/v) or greater results in a drastic decrease in gel swelling capacity. The implication is that the covalent bonds that bridge the carboxylic acid groups of the NaCMC polymer chains increase the rigidity of the gel network. The increased rigidity corresponds to less water being required for gel formation since there is a reduction in the volume available for the hydrogen bonding of water to the NaCMC chains (i.e., reduction in swelling). Thus, as cross-linking increases, gel rigidity increases, and required water volume decreases. In addition to the cross-linking agent (TCA) concentration, reaction temperature and duration are also affect a gel's swelling behavior, since all of these factors combined contribute to the degree of cross-linking.

It is known that a differential scan calorimetry (DSC) analysis can show that a citric acid anhydride forms when citric acid (TCA) is heated to a temperature above 60° C. A complete degradation of TCA starts at about 160° C. and that of NaCMC at a temperature above 100° C. Based on the temperature information and on previously reported hydrogel formula percentages, the following materials were placed into a 250 mL glass beaker and heated to 68° C. on a hot plate/magnetic stirrer:

100 mL corn oil (representing FOG)
  2 gNaCMC
  20 g TCA

Initially, low amounts of material were used in an effort to determine the minimal quantities needed to gel the FOG, but do demonstrate the workability of the ratios involved. In this first attempt, the NaCMC and TCA powders did not blend into the FOG; therefore, there was an incremental addition of what amounted to a total of 5 g SDS. The powders still did not blend into the FOG, so 20 mL water was added and stirred with a magnetic stir bar. The result was some FOG thickening but with a layer of FOG remaining at the mixture surface. After adjusting the first formula by incrementally and gradually adding materials, the second attempt of thickening corn oil with the application of heat (68° C.) worked. The working formula is listed below:

100 mL corn oil (representing FOG)
  10 gNaCMC
  20 g TCA
  5 g SDS
  30 mL water Seven subsequent attempts of repeating the above protocol to thicken corn oil failed miserably. Different lengths of heating times and heating temperatures—from 40° C. to 70° C.—were tried; all these attempts ended with poor results. In all cases, the heated mixtures looked clabbered.

Observations of the ways in which the mixtures failed to gel led to suspecting that the applied heat was adversely affecting the SDS. It is known that SDS undergoes hydrolysis at elevated temperatures and that prolonged heating at temperatures of 40° C. or higher causes SDS decomposition. Specifically, at such high temperatures, alkyl sulfates decompose into fatty alcohols and sodium sulfate.

Therefore, the first successful thickening of corn oil using 30 mL water and the application of heat was serendipitous. It is now thought to have worked because, in trying to determine minimal ingredient amounts, the mixture components were added slowly over a period of 40 minutes. Apparently, by the time the SDS was added to the mixture, the temperature had dropped below 40° C. such that the SDS did not decompose; it resulted in a gel that passed the five-minute paint filter test. The outcome is deemed serendipitous in that, because the experiment worked, the protocol was not abandoned. Further experiments were conducted that eventually led to those in which the SDS was not heated.

Further Experiments—Without Heating SDS

Once it was determined that the SDS should not be heated above 40° C., a variety of approaches were tried. These approaches include the following protocols and results:

1) Heat the water, NaCMC, and TCA together. Because this mixture formed a thick paste, it was quickly removed from the hot plate when the temperature had reached only 35° C. to prevent it from burning. In a separate beaker, corn oil and SDS were stirred together. The pasty water mixture was blended (using a glass stirring rod) into the oil/SDS mixture. This method produced a thickened gel that passed the five-minute paint filter test, but blending the pasty mixture into the oil/SDS mixture proved to be very difficult. Therefore, this protocol is thought to be unconducive for large-scale applications.

2) Heat corn oil with NaCMC and TCA to 70° C. Upon reaching 70° C., the heated oil mixture was removed from the hot plate. In a separate beaker, SDS was dissolved into 30 mL water. (Note the optimal solubility temperature for SDS is 20° C.) The aqueous SDS solution was poured into the oil mixture. The oil thickened and passed the five-minute paint filter test. Apparently, the aqueous SDS solution (23° C.) and added powders were cool enough to quickly lower the temperature of the oil to a point below that of which SDS decomposes. This protocol works and has potential for large-scale applications.

3) In an attempt to circumvent the need for dissolving SDS in water, a liquid form of SDS was sought to better suit a large-scale application of FOG-thickening. Because Dawn® dish detergent lists SDS as its first ingredient, experiments were conducted in which a 17% solution of this liquid detergent was substituted for the aqueous SDS solution. (The concentration of 17% matches that of the SDS solution used in the successful FOG-thickening formula.) Initial attempts at using Dawn® in place of SDS failed. Increasing the Dawn® concentration did not work, either. A further attempt of substituting the dissolved SDS with liquid detergent was made using Dawn Ultra®, which is advertised as being 4Xs the concentration of regular Dawn® dish detergent. The corn oil thickened somewhat using the Dawn Ultra® detergent but not enough to pass the five-minute paint filter test.

At this point, it was decided to stick with the protocol that worked (protocol (2) above) but to determine the lowest temperature required to thicken 100 mL oil (representing FOG) with only 30 mL water and that is also a permissible temperature for SDS to be effective as a water and oil emulsifier. The working protocol was carried out seven times, each time with a different temperature. The temperatures tested were 70° C., 60° C., 50° C., 40° C., 35° C., 30° C. and 25° C. The protocol followed for each experiment was identical except for the temperature and is outlined below:

Using a hot plate, heat 100 mL corn oil (representing FOG) in a 250 mL glass beaker to XX° C.

In a separate beaker, (using a glass stir rod) mix 10 g NaCMC and 20 g TCA powders together.

In another separate beaker, (using a glass stir rod) mix 5 g SDS flakes into 30 mL water.

Upon the oil reaching the desired temperature, pour the mixed NaCMC and TCA powders into the hot oil.

Leaving the beaker on the hot plate, stir until the dry components are blended into the oil.

Remove the beaker from the hot plate.

Pour the SDS aqueous solution into the mixture. Stir vigorously with a glass stir rod.

Upon thickening, pour the gel into a fine-mesh paint filter and let set for five minutes.

In each case (i.e., for each temperature), the oil gelled and passed the five-minute paint filter test. The gels were allowed to remain in the paint filters overnight and checked for drips the next day. The gels produced at 25° C. and 60° C. each dripped a little overnight. Based on these results, 30° C. is the optimum temperature that worked to gel the oil using only 30 mL of water and maintain the stability of SDS to emulsify the oil and water.

Two final types of experiments were conducted: (1) Experiments to determine if it is necessary at 30° C. to dissolve the SDS in the water or if the SDS flakes can be mixed together with the NaCMC and TCA powders and together be added to the oil, followed by the addition of water; and (2) Control experiments; that is, follow the heating protocol that works to thicken the FOG—but without heating. Each protocol is provided below.

Final Experiment #1

Using a hot plate, heat 100 mL corn oil (representing FOG) in a 250 mL glass beaker to 30° C.

In a separate beaker mix (using a glass stir rod) 10 g NaCMC, 20 g TCA, and 5 g SDS.

Upon the FOG reaching 30° C., add the combined NaCMC, TCA, and SDS powders to the heated FOG.

After mixing the dry components with the heated FOG, pour 30 mL water into the mixture.

Remove the beaker from the hot plate and stir.

The FOG readily gelled and thickened even more than when the SDS is first dissolved in water. However, when this experiment was repeated, different results were obtained, as discussed below. The above experiment was repeated several times for two purposes:

1) Gel Mass Determination. The main reason for repeating the above experiment multiple times was in order to measure the mass of three gels for the purpose of calculating the mass percentage decrease. A mass decrease of 12% was achieved. Although originally thought to be due to heating, the decrease is now understood to be the result of first dissolving the SDS into water prior to adding it to the NaCMC-TCA-FOG mixture.

2) Reproducibility. The second reason for repeating "Final Experiment #1" multiple times was for the purpose of proving reproducibility. Unexpectedly, when this experiment was repeated, the oil did not gel. Although the failed gelling attempts were disappointing, a significant determination and observations were made:

a) The factor that determines when the FOG thickens into a gel versus when it does not thicken is the dissolution of the SDS. In all failed attempts in which the dry components were added together followed by adding water, flakes of SDS could be seen dispersed throughout the mixture. If the SDS flakes do not dissolve completely, the FOG does not gel.

b) When emulsification of the FOG and water takes place, the color abruptly and distinctly changes from a cream color (the color of the NaCMC powder) to white (the color of SDS). White swirls appear as the SDS solution is blended into the rest of the mixture until, eventually; the entire gel is a uniform white color. When this happens, a gel that passes the five-minute paint filter test is produced.

Final Experiment #2 (Control A)

Pour 100 mL corn oil (representing FOG) into a 250 mL glass beaker.

In a separate beaker (using a glass stir rod) mix 10 g NaCMC, 20 g TCA, and 5 g SDS.

Add the mixed NaCMC, TCA, and SDS powders to the corn oil.

Immediately after adding the dry components, pour 30 mL water into the mixture.

Stir until components are mixed and pour into a fine-mesh paint filter.

This mixture did not thicken sufficiently; it immediately and copiously began dripping through the fine-mesh paint filter and thereby failed the five-minute paint filter test.

Final Experiment #2 (Control B)

Pour 100 mL corn oil (representing FOG) into a 250 mL glass beaker.

In a separate beaker, (using a glass stir rod) mix 10 g NaCMC and 20 g TCA powders together.

In another separate beaker, (using a glass stir rod) mix 5 g SDS flakes into 30 mL water.

Pour the mixed NaCMC and TCA powders into the corn oil.

Stir until the dry components are blended into the FOG.

Pour the SDS aqueous solution into the mixture. Stir vigorously with a glass stir rod.

Upon thickening, pour the gel into a fine-mesh paint filter and let set for five minutes.

Unexpectedly, this oil did thicken and very nicely. The oil was at room temperature (oil temperature was measured to be 21° C.) prior to adding any components. This was the last experiment conducted and was thought to serve merely as a control to prove that heating the mixture makes a difference. However, instead, the control experiment indicates just the opposite: that is, heating the FOG does not always make a difference.

It is preferred that the SDS flakes first be dissolved in water before being added to the NaCMC-TCA-FOG mixture. The use of a finer grade of SDS powder does not make a difference. It is not necessary to heat the NaCMC and TCA in order to achieve a 12% reduction in the mass of gelled FOG.

The new formula for thickening 100 mL corn oil (representing FOG):

10 g NaCMC 20 g TCA 5 g SDS dissolved into 30 mL water

In addition to a decrease in required water volume (from 60 mL to 30 mL), there is also a decrease in the required mass of NaCMC used—from 15 g to 10 g—as compared with the previously reported oil-thickening formula.

The final packaging of an emulsion may impact emulsion stability due to interfacial wetting behavior, permeation, or leaching of components into or out of the packaging material so it may be wise to ensure that gel packaging does not interfere with gelled FOG stability.

Other potential variants include the use of an air compressor for the purpose of mixing the gelling components on a large scale. Use of NaCMC with a low degree of substitution may enable the volume of water may be reduced even further.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An emulsification method to make FOG into a gel suitable for disposal in a landfill comprising:
   mixing FOG with citric acid, and sodium carboxymethyl cellulose,
   dissolving sodium dodecyl sulfate in water to make a solution, and
   mixing the FOG, citric acid, and sodium carboxymethyl cellulose mixture with the aqueous solution of sodium dodecyl sulfate to form a gel,
   wherein the gel passes the paint filter test according to SW-846 Test Method 9095B, such that liquid does not pass through a filter within a five-minute test period.

2. The method of claim 1, including a viscosifier.

3. The method of claim 2, wherein the viscosifier is a cellulose.

4. The method of claim 3, wherein the carboxymethyl cellulose is sodium carboxymethyl cellulose.

5. The method of claim 1, wherein mixing FOG, a detergent, and water, and a viscosifier to form a thickened emulsion, includes mixing with a cross-linking agent.

6. An emulsification method as claimed in claim 1 wherein the water-to-FOG ratio of the gel is less than 0.8, volume to volume.

7. An emulsification method as claimed in claim 1 wherein the water-to-FOG ratio of the gel is less than 0.3, volume-to-volume.

8. An emulsification method as claimed in claim 1 wherein mixing takes place at about 30° C.

9. An emulsification method as claimed in claim 1 wherein the water is added as a solution with a detergent.

10. The method of claim 9, wherein the detergent is an amphiphilic detergent.

11. The method of claim 10, wherein the detergent is a sulfate-type anionic detergent.

12. The method of claim 11, wherein detergent is sodium dodecyl sulfate.

* * * * *